(12) United States Patent
Faulk et al.

(10) Patent No.: US 9,174,146 B2
(45) Date of Patent: Nov. 3, 2015

(54) CLOSED GAS BUSTER SEPARATION SYSTEM AND METHOD

(71) Applicant: Greene's Energy Group, LLC, Houston, TX (US)

(72) Inventors: Elwin Faulk, Longville, LA (US); Derek J. Dautreuil, Lafayette, LA (US); Brandon Faulk, Moss Bluff, LA (US)

(73) Assignee: Greene's Energy Group, LLP, Houston, TX (US)

( * ) Notice: Subject to any disclaimer, the term of this patent is extended or adjusted under 35 U.S.C. 154(b) by 36 days.

(21) Appl. No.: 14/063,391

(22) Filed: Oct. 25, 2013

(65) Prior Publication Data

US 2014/0116253 A1 May 1, 2014

Related U.S. Application Data

(60) Provisional application No. 61/719,071, filed on Oct. 26, 2012.

(51) Int. Cl.
*B01D 19/00* (2006.01)

(52) U.S. Cl.
CPC ........ *B01D 19/0042* (2013.01); *B01D 19/0063* (2013.01)

(58) Field of Classification Search
None
See application file for complete search history.

(56) References Cited

U.S. PATENT DOCUMENTS

| | | | |
|---|---|---|---|
| 2,664,963 A | 1/1954 | Lovelady et al. | |
| 3,389,536 A | 6/1968 | Bull | |
| 3,418,252 A * | 12/1968 | Francis, Jr. | 96/184 |
| 3,727,382 A * | 4/1973 | Jackson | 96/174 |
| 4,208,196 A * | 6/1980 | Coggins et al. | 96/184 |
| 4,257,895 A | 3/1981 | Murdock | |
| 4,396,404 A | 8/1983 | Engelman et al. | |
| 4,539,023 A | 9/1985 | Boley | |
| 4,583,998 A | 4/1986 | Reid | |
| 6,183,541 B1 | 2/2001 | Compton | |
| 6,187,079 B1 | 2/2001 | Bridger | |
| 6,214,092 B1 | 4/2001 | Odom et al. | |
| 7,531,099 B1 | 5/2009 | Rhodes | |
| 8,398,756 B2 | 3/2013 | Whiteley | |
| 2009/0282985 A1 | 11/2009 | Whiteley | |
| 2010/0326922 A1 | 12/2010 | Varanasi et al. | |

OTHER PUBLICATIONS

PCT International Searching Authority/US, International Search Report and Written Opinion of the International Searching Authority, mailed Mar. 5, 2014, for PCT/US2013/066878, "Closed Gas Buster Separation System and Method."

* cited by examiner

*Primary Examiner* — Duane Smith
*Assistant Examiner* — Phillip Shao
(74) *Attorney, Agent, or Firm* — Jones Walker LLP (57) ABSTRACT

A separation system including a horizontal separation vessel having a gas separation chamber defined by an upper wall of the separation vessel, a gas dome extending above the upper wall, a baffle plate disposed within the separation vessel, and a level of a lower surface of the baffle plate. The lower surface of the baffle plate is disposed below a level of an upper surface of a liquid weir disposed within the separation vessel. The upper surface of the liquid weir may set a liquid level within the separation vessel. The gas separation chamber may include a hydrostatic pressure seal zone between the level of the upper surface of the liquid weir and the level of the lower surface of the baffle plate. Liquid within the hydrostatic pressure seal zone may prevent a gas disposed within the gas separation chamber from escaping into a remainder of the separation vessel.

24 Claims, 8 Drawing Sheets

CLOSED GAS BUSTER SEPARATION SYSTEM AND METHOD

CROSS-REFERENCE TO RELATED APPLICATION

This application claims the benefit of and priority to U.S. Provisional Patent Application No. 61/719,071, filed on Oct. 26, 2012, which is incorporated herein by reference.

BACKGROUND

Liquid/gas separators operating at atmospheric pressure, sometimes referred to as gas busters, are standard equipment on virtually all oil and gas rigs. Because gas busters operate at atmospheric pressure, they offer operational simplicity by not requiring control valves for the gas discharge line or the liquid discharge line. Pressurized liquid/gas separators are traditionally designed to operate with moderate backpressure, e.g., less than 50 psi. Pressurized separators are utilized to overcome line pressure losses when an extensive length of vent line is required to safely flare or vent hazardous gas at a specific distance from other operations for safety reasons. Pressurized separators may be used with high $H_2S$ content.

Standard gas busters utilize a U-tube on the liquid outlet line that creates a liquid hydraulic seal to prevent gaseous components from exiting the separator through the liquid outlet. The hydrostatic pressure created by the U-tube may determine the maximum allowable pressure under which a gas buster can operate.

DETAILED DESCRIPTION OF THE PREFERRED EMBODIMENTS

Figure 1:
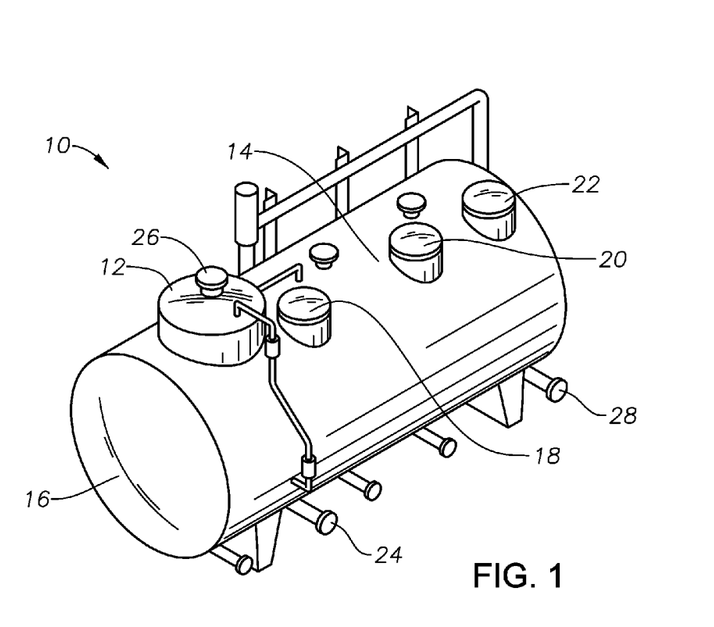
FIG. 1 is a left perspective view of a closed gas buster separation system.
Figure 2:
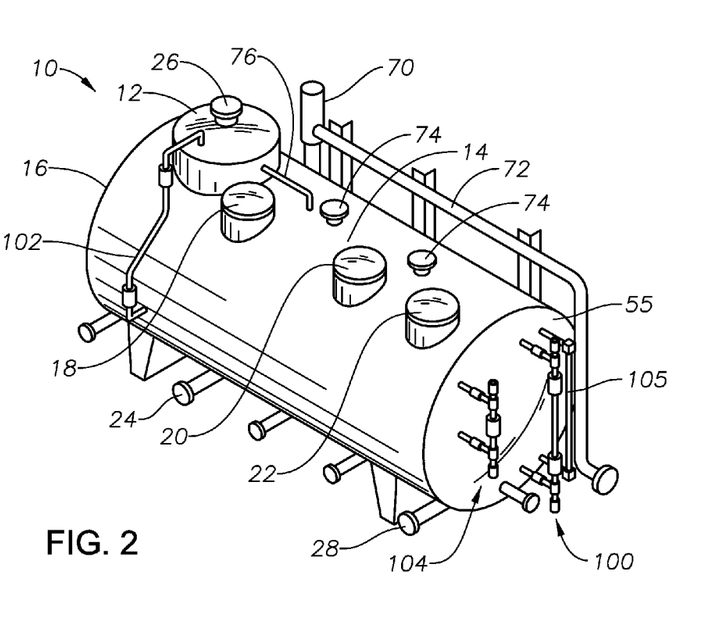
FIG. 2 is a right perspective view of the separation system.

FIGS. 1 and 2 illustrate gas buster separation system including separation vessel 10. Separation vessel 10 may have a generally cylindrical shape. Alternatively, separation vessel 10 may have any other shape. Separation vessel 10 may include gas dome 12 extending from upper wall 14 of separation vessel 10 near first end 16. Ports 18, 20, and 22 may also extend from upper wall 14 of separation vessel 10 to allow for visual inspection or sample collection of the liquid contents of separation vessel 10. Alternatively, separation vessel 10 may include less than or more than three ports extending from upper wall 14. Separation vessel 10 may also include fluid inlet 24, gas outlet 26, and liquid outlet 28.

Figure 3:
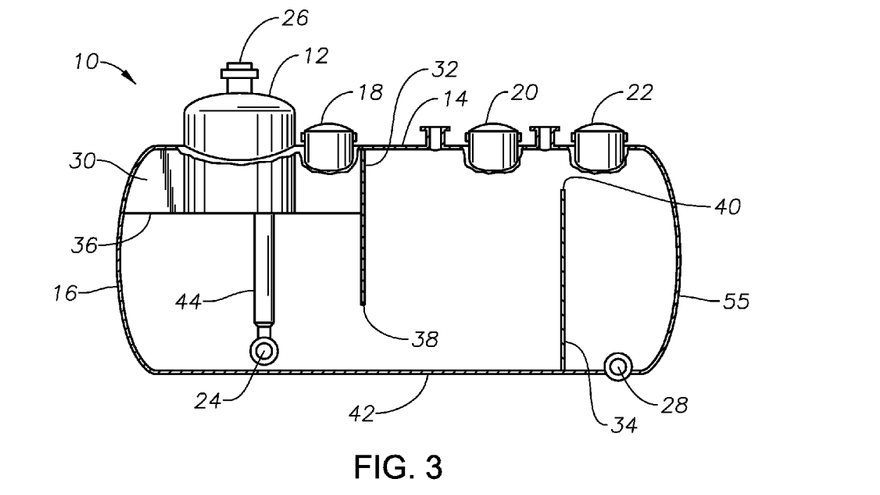
FIG. 3 is a front inside view of the separation system.
Figure 4:
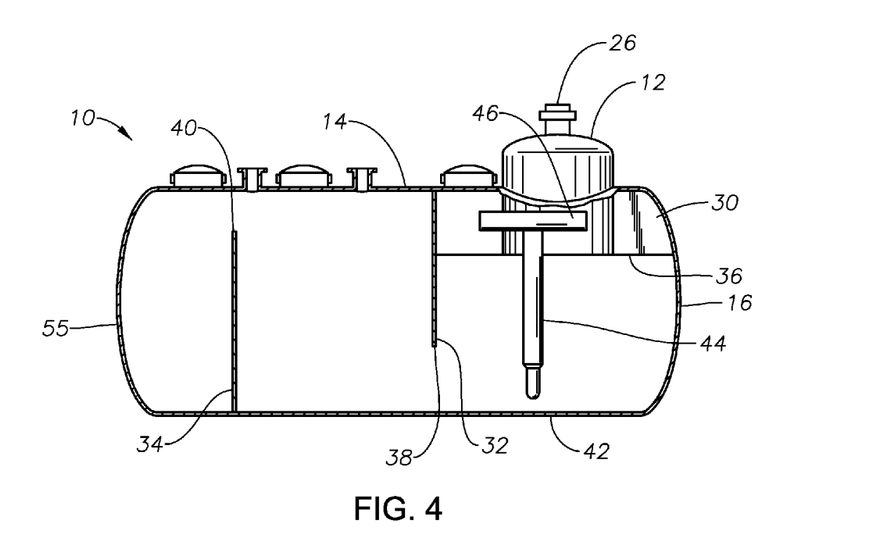
FIG. 4 is a rear inside view of the separation system.

With reference to FIGS. 3 and 4, separation vessel 10 may include longitudinal baffle plate 30, transverse baffle plate 32, and liquid weir 34. Longitudinal baffle plate 30 may extend longitudinally from first end 16 of separation vessel 10 to transverse baffle plate 32, and vertically from upper wall 14 of separation vessel 10 to lower surface 36. Transverse baffle plate 32 may extend vertically from upper wall 14 of separation vessel 10 to lower surface 38. Lower surface 38 of transverse baffle plate 32 may be positioned lower than lower surface 36 of longitudinal baffle plate 30 as shown in FIGS. 3 and 4. In one embodiment, lower surface 38 of transverse baffle plate 32 may be positioned approximately twenty-four inches above the bottom of separation vessel 10. Alternatively, lower surface 38 may be positioned at the same level within separation vessel 10 as lower surface 36. Liquid weir 34 may extend vertically from upper surface 40 to lower wall 42 of separation vessel 10. In one embodiment, upper surface 40 of liquid weir 34 may be positioned approximately fifteen inches below the top of separation vessel 10. Upper surface 40 of liquid weir 34 may be positioned higher than lower surface 36 of longitudinal baffle plate 30 and lower surface 38 of transverse baffle plate 32. Fluid inlet 24 may be in fluid communication with internal fluid line 44 and fluid diverter 46. Fluid diverter 46 may be positioned above lower surface 36 of longitudinal baffle plate 30 and lower surface 38 of transverse baffle plate 32 as shown in FIG. 4.

Figure 5:
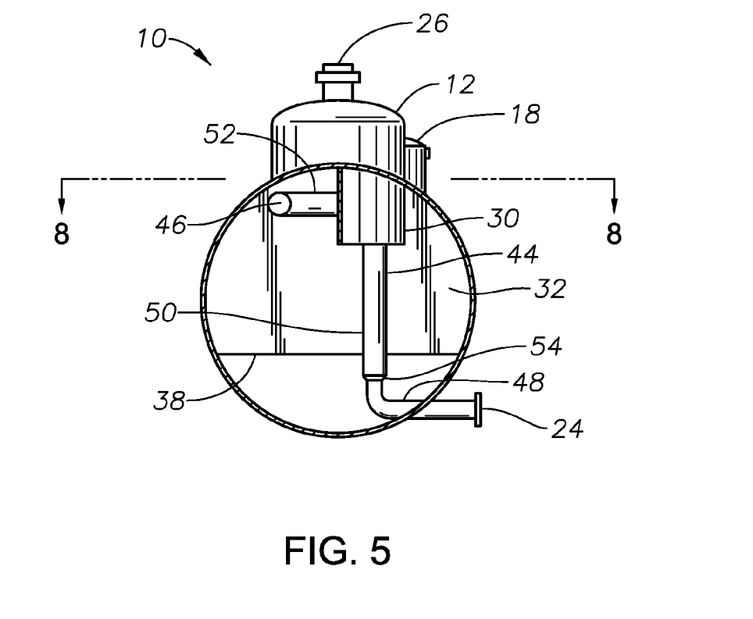
FIG. 5 is a left inside end view of the separation system.
Figure 6:
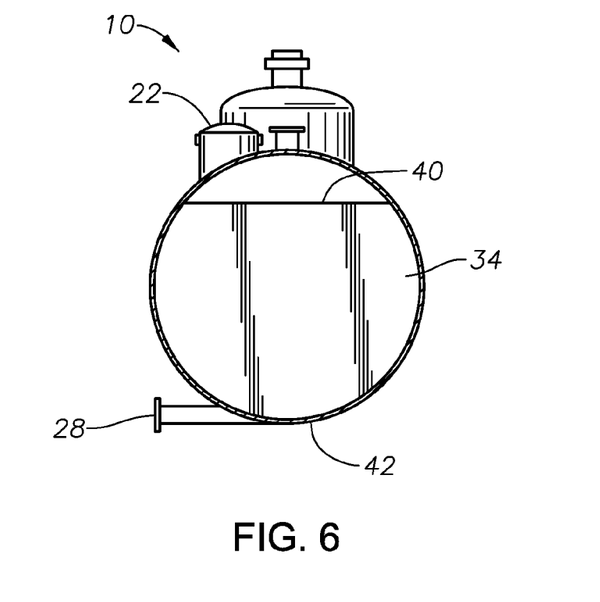
FIG. 6 is a right inside end view of the separation system.

FIG. 5 is an internal view of first end 16 of separation vessel 10. Internal fluid line 44 may include lower horizontal section 48 extending from fluid inlet 24 to vertical section 50, which may extend to upper horizontal section 52. Vertical section 50 may include expansion section 54 that may increase the diameter of internal fluid line 44. In one embodiment, expansion section 54 may increase the diameter of internal fluid line 44 from approximately four inches to approximately 6 inches. Upper horizontal section 52 may extend from vertical section 50 to fluid diverter 46. FIG. 6 is an internal view of second end 55 of separation vessel 10. FIG. 6 illustrates liquid weir 34 extending from lower wall 42 of separation vessel 10 to upper surface 40 of liquid weir 34.

Figure 7:
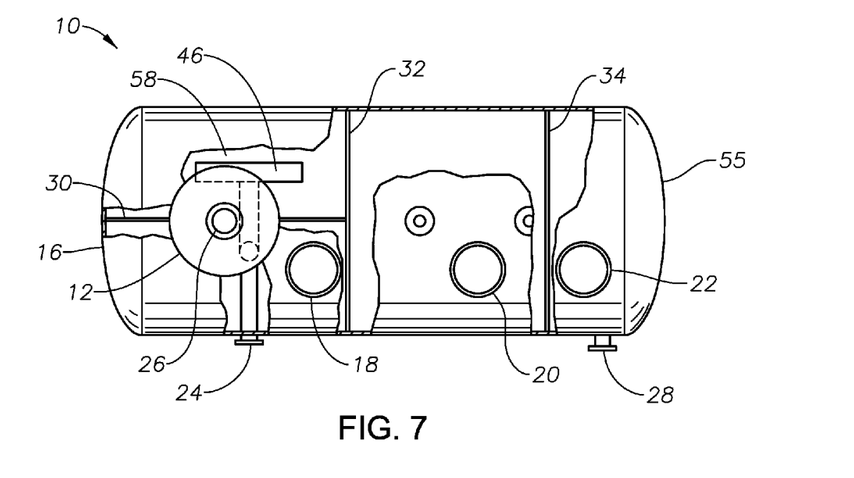
FIG. 7 is a top inside view of the separation system.
Figure 8:
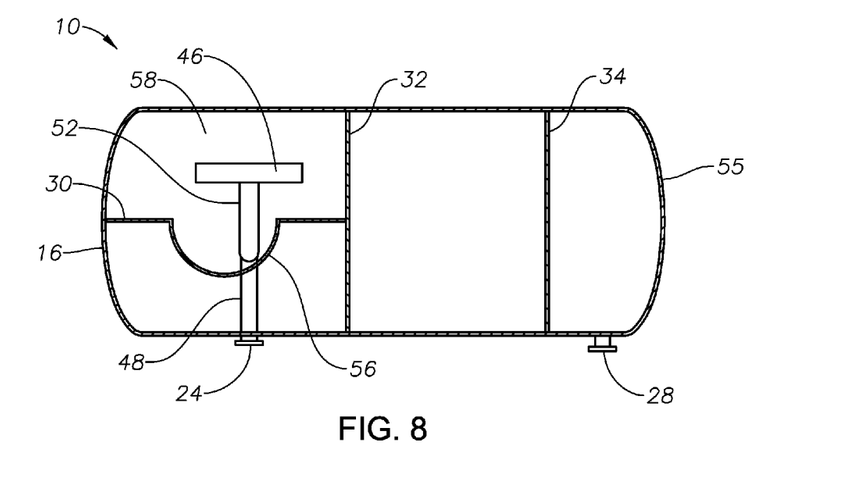
FIG. 8 is a cross-sectional view of the separation system taken along line 8-8 in FIG. 5.

FIGS. 7 and 8 show longitudinal baffle plate 30, transverse baffle plate 32, liquid weir 34, gas dome 12, and ports 18, 20, and 22. Longitudinal baffle plate 30 extends from first end 16 of separation vessel 10 to transverse baffle plate 32. Longitudinal baffle plate 30 may include shaped section 56 matching the shape of an outer surface of gas dome 12. If the outer surface of gas dome 12 is curved, shaped section 56 may be curved to match the curved shape of the outer surface of gas dome 12. Alternatively, if the outer surface of gas dome 12 is any other shape, shaped section 56 may match the shape of the outer surface of gas dome 12. Gas dome 12, longitudinal baffle plate 30, transverse baffle plate 32, and the side walls and upper wall 14 of separation vessel 10 may form gas separation chamber 58. A lower boundary of gas separation chamber 58 may be defined by the level of the higher of lower surfaces 36 and 38. Fluid diverter 46 may be disposed within gas separation chamber 58.

Figure 9:
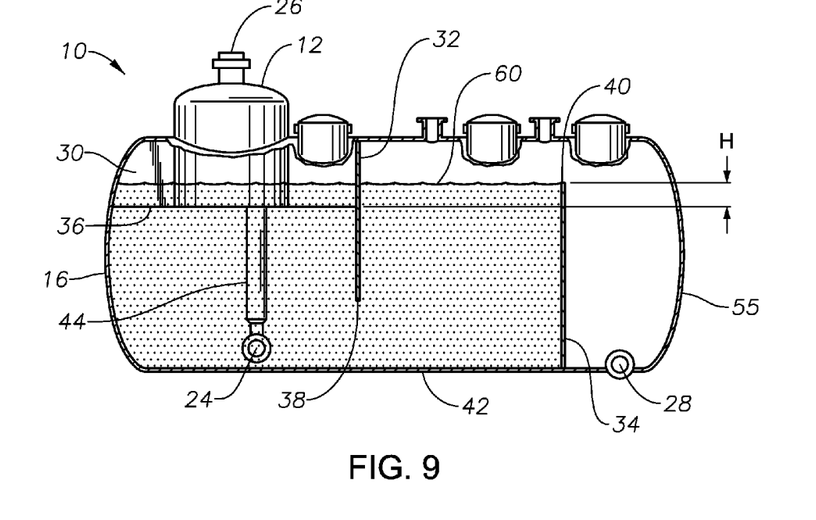
FIG. 9 is a front inside view of the separation system showing the liquid level.
Figure 10:
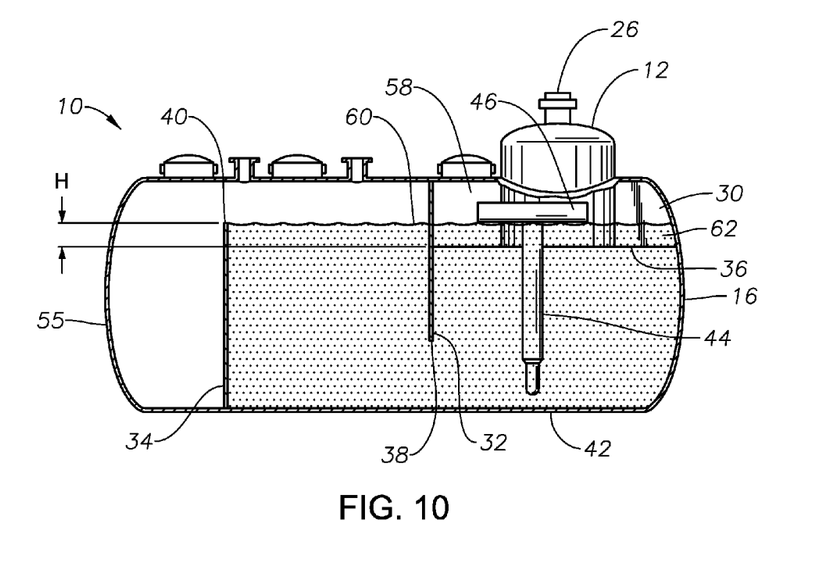
FIG. 10 is a rear inside view of the separation system showing the liquid level.
Figure 11:
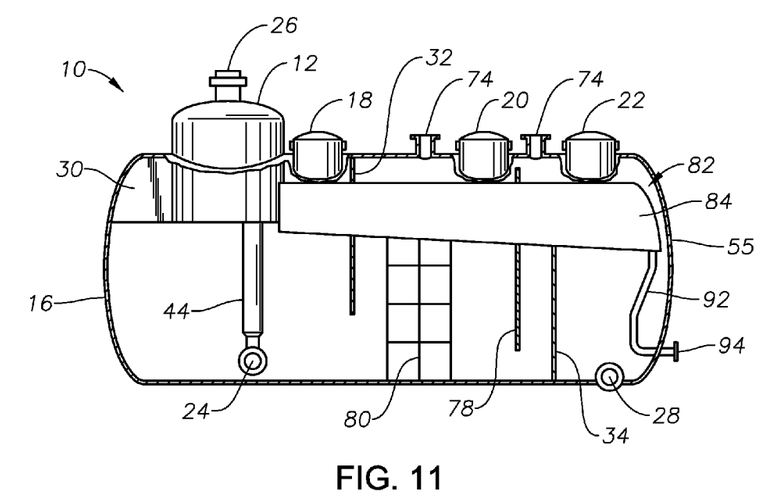
FIG. 11 is a front inside view of an alternate embodiment of the separation system.
Figure 12:
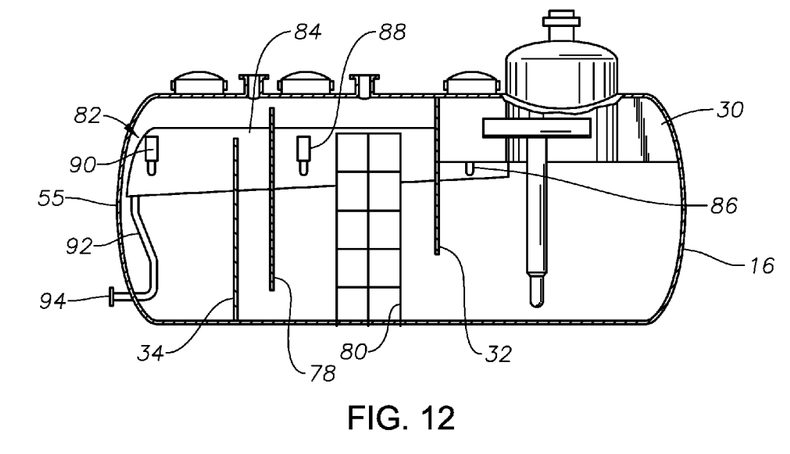
FIG. 12 is a rear inside view of the alternate embodiment of the separation system.
Figure 13:
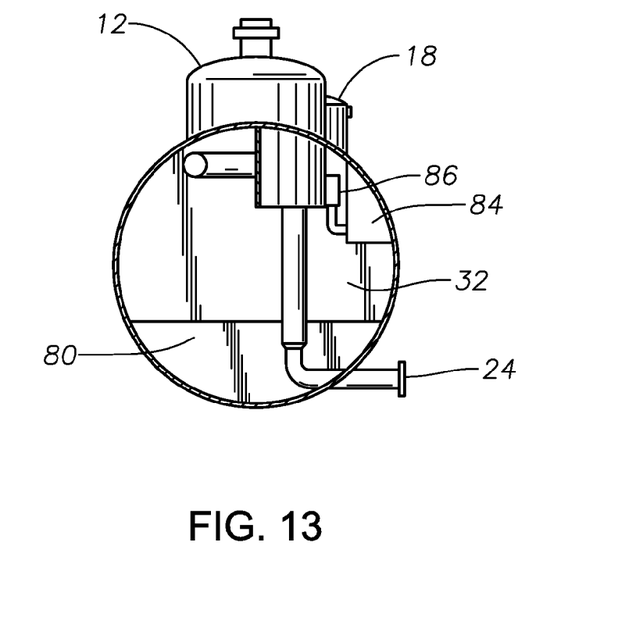
FIG. 13 is a left inside end view of the alternate embodiment of the separation system.
Figure 14:
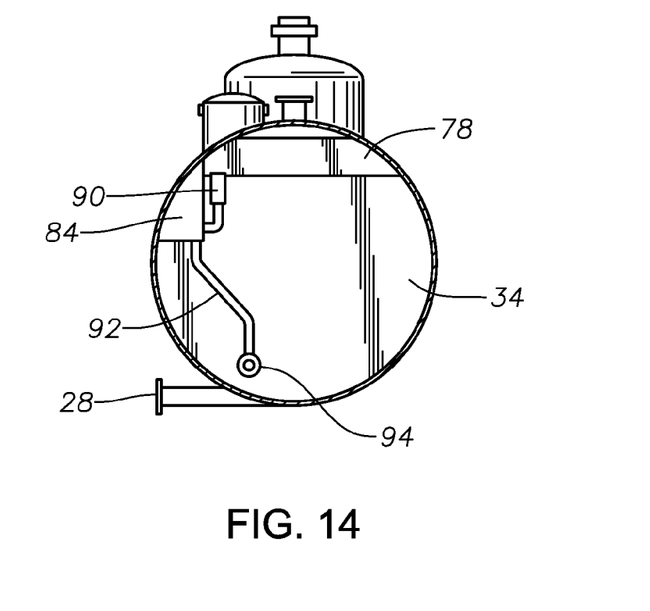
FIG. 14 is a right inside end view of the alternate embodiment of the separation system.

With reference to FIGS. 9 and 10, separation vessel 10 may be used to separate gaseous components from liquid components of a fluid mixture. Liquid level 60 (also referred to herein as liquid set level) may be set within separation vessel 10 by the level of upper surface 40 of liquid weir 34. Liquid level 60 may be above lower surface 36 of longitudinal baffle plate 30 and lower surface 38 of transverse baffle plate 32. Initially, separation vessel 10 may be charged with liquid by feeding only liquids into fluid inlet 24, through internal fluid line 44, and through fluid diverter 46. The liquids may fall from fluid diverter 46 to lower wall 42 of separation vessel 10 below gas separation chamber 58, and may collect at lower wall 42 between first end 16 of separation vessel 10 and liquid weir 34. As more liquid is fed into separation vessel 10, the liquid level may rise until it reaches liquid level 60 at the level of upper surface 40 of liquid weir 34, at which time the liquid may flow over upper surface 40 and exit separation vessel 10 through liquid outlet 28, thereby maintaining liquid level 60. Once liquid level 60 is achieved, separation vessel 10 may be used for separating gaseous components from liquid components.

Referring now to FIGS. 5, 9, and 10, a fluid mixture containing liquid and gaseous components may be fed into fluid inlet 24, and may flow through lower horizontal section 48 of internal fluid line 44, through vertical section 50 of internal fluid line 44, through upper horizontal section 52 of internal fluid line 44, through fluid diverter 46, and into gas separation chamber 58. The velocity of the fluid flow may decrease as the fluid mixture flows through expansion section 54 in vertical section 50. The decreased velocity may aid in the separation of the gaseous components from the liquid components. As the fluid mixture flows through upper horizontal section 52, the gaseous components may begin to rise and separate from the liquid components. The velocity of the fluid flow may be further decreased by flowing through fluid diverter 46. Fluid diverter 46 may be a T-shaped conduit that divides the fluid flowing through upper horizontal section 52 of internal fluid line 44 into two paths and through two openings into gas separation chamber 58. Fluid diverter 46 may also prevent damage to the internal surface of separation vessel 10 that may occur with continued fluid flow directed to the internal surface by directing the fluid flow away from the nearest internal surface of separation vessel 10.

Upon exiting one of the two openings of fluid diverter 46, the gaseous components of the fluid mixture may rise within gas separation chamber 58 while the liquid components may fall within separation vessel 10. The gaseous components may continue to rise through gas dome 12 and may exit through gas outlet 26. The additional height provided by gas dome 12 further reduces the gas velocity, thereby allowing mist droplets to form into larger and heavier liquid droplets that may fall into the liquid within gas separation chamber 58 instead of exiting with the gaseous components through gas outlet 26. The liquid components may fall to liquid level 60, and eventually flow under lower surface 36 of longitudinal baffle plate 30, under lower surface 38 of transverse baffle plate 32, over upper surface 40 of liquid weir 34, and through liquid outlet 28.

By setting the level of upper surface 40 of liquid weir 34 (and liquid level 60) above lower surface 36 of longitudinal baffle plate 30 and lower surface 38 of transverse baffle plate 32, gas separation chamber 58 may be hydraulically sealed. Specifically, hydrostatic pressure seal zone 62 may be formed by the liquid components positioned within gas separation chamber 58 between liquid level 60 and lower surface 36 of longitudinal baffle plate 30. The hydrostatic pressure of the liquid components positioned in hydrostatic pressure seal zone 62 may prevent the gaseous components from flowing under lower surfaces 36 and 38, and thereby exiting gas separation chamber 58. Separation vessel 10 may be designed such that hydrostatic pressure seal zone 62 has height H (shown in FIGS. 9 and 10), thereby creating a hydrostatic pressure sufficient to prevent the gaseous components from flowing under lower surface 36 of longitudinal baffle plate 30. Height H may depend upon the density of the liquid components in the fluid mixture. In one embodiment, height H may be between approximately two inches and approximately twelve inches. In a more preferred embodiment, height H may be at least approximately six inches.

Where the fluid mixture fed into fluid inlet 24 includes a lighter liquid component (i.e., having a lower density) and a heavier liquid component (i.e., having a higher density), the liquid level within gas separation chamber 58 may be different from liquid level 60 within the remainder of separation vessel 10. Specifically, the liquid level within gas separation chamber 58 may be higher as the lighter liquid component collects on the surface of the liquid within gas separation chamber 58, forcing the heavier liquid component under lower surface 36 of longitudinal baffle plate 30 and lower surface 38 of transverse baffle plate 32 and into the remainder of separation vessel 10.

As shown in FIG. 7, ports 18, 20, and 22 are positioned on upper wall 14 of separation vessel 10 in areas other than gas separation chamber 58. Port 18 may be positioned between first end 16 of separation vessel 10 and transverse baffle plate 32, but behind longitudinal baffle plate 30 (i.e., not within gas separation chamber 58). Port 20 may be positioned between transverse baffle plate 32 and liquid weir 34. Port 22 may be positioned between liquid weir 34 and second end 55 of separation vessel 10. Because the gaseous components are trapped within gas separation chamber 58, ports 18, 20, and 22 may be opened during operation of separation vessel 10 at atmospheric pressure to allow for visual inspection or sampling of the liquid inside. In this way, separation vessel 10 allows access to the liquid within separation vessel 10 during separation at atmospheric pressure. Alternatively, separation vessel 10 may be operated under a pressure greater than atmospheric pressure, and ports 18, 20, and 22 may be sealed and may remain closed during separation operations. Under atmospheric operation, gas outlet 26 may be open directly to the atmosphere such that the gas components of the fluid mixture are simply vented through a vent stack. Under pressurized conditions, separation vessel 10 may utilize back pressure valves.

Separation vessel 10 may include additional features, such as a coalescing pack disposed between transverse baffle plate 32 and liquid weir 34, an oil bucket, or a gas relief valve. For example, FIGS. 1 and 2 show separation vessel 10 including pressure safety valve 70 in fluid communication with gas separation chamber 58. Pressure safety valve 70 may remain closed during ordinary operations, but may be configured to open when a predetermined pressure is met or exceeded within gas separation chamber 58. Pressure safety line 72 may be in fluid communication with pressure safety valve 70 for venting off a portion of a gas contained within gas separation chamber 58 when the predetermined pressure is met or exceeded in order to lower the pressure within gas separation chamber 58. Separation vessel 10 may also include one or more secondary vents 74 in fluid communication with portions of separation vessel 10 other than gas separation chamber 58. Secondary vents 74 may be used to vent gases that may flash out of the liquid phase in separation vessel 10 outside of gas separation chamber 58. Separation vessel 10 may further include gas equalizer line 76 in fluid communication with gas dome 12 and a portion of vessel 10 outside of gas separation chamber 58. Gas equalizer line 76 may remain closed during operation of separation vessel 10 at atmospheric pressure to prevent transfer of gas from gas separation chamber 58 into the remainder of separation vessel 10. During operation of separation vessel 10 at a pressure greater than atmospheric pressure, gas equalizer line 76 may allow transfer of gas from gas separation chamber 58 to the remainder of separation vessel 10. In the pressurized mode, gas equalizer line 76 may equalize the pressure of gas separation chamber 58 with the remainder of separation vessel 10 in order to maintain pressure seal zone 62 in gas separation chamber 58.

FIGS. 11-15 illustrate an alternate embodiment of separation vessel 10. In this embodiment, separation vessel 10 may include second transverse baffle plate 78 and coalescing media pack 80 between transverse baffle plate 32 and liquid weir 34. In one embodiment, coalescing media pack 80 is formed of a media framework within separation vessel 10 designed to hold one or more units of a coalescing media. For example, a user may insert, remove, or replace the coalescing media units into the media framework by climbing into separation vessel 10 with the media units through one of ports 18, 20, and 22. The media framework may be formed of steel, fiberglass, or any other durable material suited for use with the contents of separation vessel 10 as understood by one of ordinary skill in the art. The media units may contain polypropylene, fiberglass, aluminum, stainless steel, any oleophilic granular material, or any other material known to coalesce oil from water. The media units may include corrugated plates, granular media, or any other media form capable of being removably positioned within the media framework within separation vessel 10. The dimensions of each media unit may be, but are not limited to, a thickness of approximately one foot and a width of approximately two feet. As the liquid within separation vessel 10 flows through coalescing media pack 80, hydrocarbon components may be separated from the remainder of the liquid components.

Figure 15:
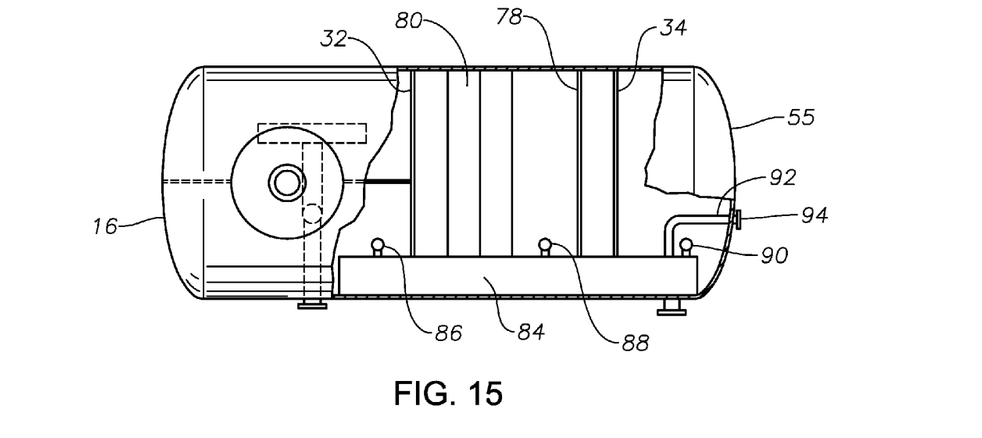
FIG. 15 is a top inside view of the alternate embodiment of the separation system.
Figure 16:
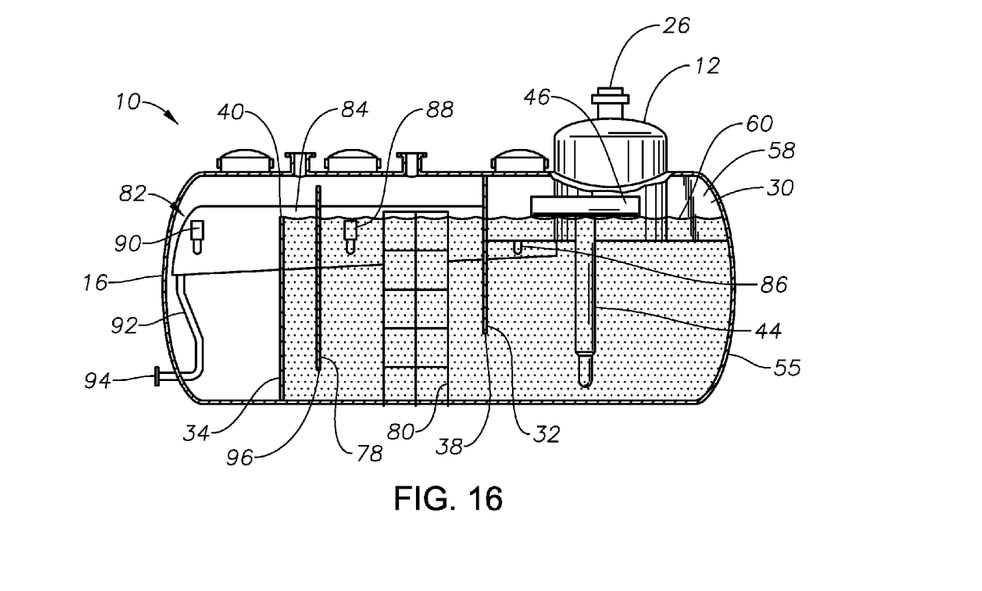
FIG. 16 is a rear inside view of the alternate embodiment of the separation system showing the liquid level.

With reference still to FIGS. 11-15, the alternate embodiment of separation vessel 10 may further include oil bucket system 82 having oil bucket 84, skimmers 86, 88, and 90, oil discharge line 92, and oil outlet 94. Skimmers 86, 88, 90 may be in fluid communication with oil bucket 84. As shown in FIG. 15, skimmer 86 may be positioned between first end 16 of separation vessel 10 and transverse baffle plate 32. Skimmer 88 may be positioned between coalescing media pack 80 and second transverse baffle plate 78. Skimmer 90 may be positioned between liquid weir 34 and second end 55 of separation vessel 10. Hydrocarbons floating on the upper surface of the liquid held within separation vessel 10 may be collected by skimmers 86, 88, 90 and fed into oil bucket 84. Any oil collected in oil bucket 84 may be discharged through oil discharge line 92 and oil outlet 94.

An upper surface of each skimmer 86, 88, 90 may be adjustable. For example, an upper portion of each skimmer 86, 88, 90 may be threadedly connected to a lower portion of the skimmer such that the upper portion may be raised by loosening the threaded connection to the lower portion. A user may access skimmers 86, 88, 90 through ports 18, 20, and 22 in order to adjust the level of skimmers 86, 88, 90. The upper surface of skimmer 86 may be set to a height slightly below liquid level 60 in order to skim only hydrocarbons off of the surface of the liquids. The upper surfaces of skimmers 88 and 90 may be positioned slightly higher than the upper surface of skimmer 86 in order to avoid collecting water with skimmers 88 and 90.

Referring now to FIGS. 11-16, the alternate embodiment of separation vessel 10 may be used to separate gaseous components from liquid components of a fluid mixture, and to further separate hydrocarbon components from other liquid components of the fluid mixture. Liquid level 60 may be set within separation vessel 10 with upper surface 40 of liquid weir 34. A liquid may be initially charged into separation vessel 10 in order to achieve liquid level 60. A fluid mixture may be fed into fluid inlet 24, and may flow through internal fluid line 44, through diverter 46, and into gas separation chamber 58. In the same way as described above, the velocity of the fluid flow may decrease as the fluid mixture flows through the expansion section of the internal fluid line 44 and through diverter 46. The decreased velocity may aid in separation of the gaseous components from the liquid components. Upon exiting diverter 46, gaseous components of the fluid mixture may rise within gas separation chamber 58 and gas dome 12, and may exit through gas outlet 26.

Liquid components of the fluid mixture exiting diverter 46 may fall to liquid level 60 within separation vessel 10. Hydrocarbon components of the liquid may rise to the surface of the liquid. Skimmer 86 may collect hydrocarbon components from the surface of the liquid. The collected hydrocarbon components may flow into oil bucket 84, ultimately exiting separation vessel 10 through oil discharge line 92 and oil outlet 94. The liquid may flow under lower surface 38 of transverse baffle plate 32 and through coalescing media pack 80, which may aid in separating hydrocarbon components from the remainder of the liquid such that the hydrocarbon components rise to the surface of the liquid phase. Second transverse baffle plate 78 may prevent the separated hydrocarbon components from flowing over upper surface 40 of liquid weir 34 and exiting separation vessel with the remainder of the liquid components through liquid outlet 28. Instead, skimmer 88 may collect hydrocarbon components, and may feed them into oil bucket 84. The liquid may continue to flow under lower surface 96 of second transverse baffle plate 78, and may rise to flow over upper surface 40 of liquid weir 34 and out through liquid outlet 28. If the liquid level rises between liquid weir 34 and second end 55 of separation vessel 10, skimmer 90 may collect hydrocarbon components from this liquid.

Separation vessel 10 may further include one or more level control system. With reference again to FIGS. 1 and 2, separation vessel 10 may include primary level system 100 for monitoring the liquid level within separation vessel 10 between liquid weir 34 and second end 55 of vessel 10, secondary level system 102 for monitoring the liquid level within separation vessel 10 near first end 16 of separation vessel 10, and oil level system 104 for monitoring the liquid level within oil bucket 84. Separation vessel 10 may further include level indicator 105 positioned near primary level system 100. Level indicator 105 may be used as a visual indication of the liquid level within separation vessel 10 between liquid weir 34 and second end 55 of vessel 10. For example, level indicator 105 may be a sight glass. Each level system 100, 102, and 104 may include an upper port in fluid communication with an upper point of separation vessel 10 and a lower port in fluid communication with a lower point of separation vessel 10. For example, the upper port of secondary level system 102 may be in fluid communication with gas dome 12 while the lower port of secondary level system 102 may be in fluid communication with a lower portion of separation vessel 10 below gas dome 12. If liquid is detected in the upper port of secondary level system 102, a user may take steps to lower the liquid level within gas separation chamber 58 to prevent liquid from exiting through gas outlet 26. Similarly, if liquid is detected in the upper port of primary level system 100, a user may take steps to lower the liquid level within separation chamber 10. If liquid is detected in the upper port of oil level system 104, a user may take steps to lower the liquid level within oil bucket 84, such as allowing the liquid to exit oil bucket 84 through oil discharge line 92 and oil outlet 94.

As readily understood in the art, level systems 100, 102, and 104 may be automated such that liquid is automatically removed from the appropriate section of separation vessel 10 when liquid is detected in the upper port of level system 100, 102, or 104. Conversely, when no liquid is detected in the lower port of level system 100, 102, or 104, a user may take steps to increase the liquid level within the appropriate section of separation vessel 10. In an automated embodiment, liquid may automatically be added to separation vessel 10 or removal of liquid may automatically be stopped when no liquid is detected in the lower port of level system 100, 102, or 104. The automated system may include valves, pumps, or other necessary equipment to automatically and selectively remove liquid from separation vessel 10 and/or add liquid to separation vessel 10, as understood by one of ordinary skill in the art. For example, when liquid is detected in the upper port of oil level system 104, system 104 may automatically open a pneumatic control valve and actuate a pump to remove liquid from oil bucket 84. When liquid is no longer detected in the lower port of oil level system 104, system 104 may automatically shut off the pump and close the pneumatic control valve.

The overall size of separation vessel 10 will not affect the separation function achieved by separation vessel 10. In one embodiment, separation vessel 10 may have an overall length in the range of approximately thirteen to approximately sixteen feet, an overall width in the range of approximately six to approximately seven feet, and an overall height in the range of approximately seven to approximately nine feet. The overall height of separation vessel 10 may be determined by transportation specifications. Gas dome 12 may have a diameter of approximately thirty-six inches. Gas outlet 26 may have a diameter of approximately eight inches. Liquid outlet 28 may have a diameter of approximately four inches. Ports 18, 20, and 22 may each have a diameter of approximately eighteen inches.

While preferred embodiments of the present invention have been described, it is to be understood that the embodiments are illustrative only and that the scope of the invention is to be defined solely by the appended claims when accorded a full range of equivalents, many variations and modifications naturally occurring to those skilled in the art from a review hereof.

We claim:

1. A separation system comprising:
   a horizontal separation vessel comprising a first end, a second end, an upper wall, a lower wall, and a gas dome extending above the upper wall near the first end;
   a liquid weir disposed within the separation vessel near the second end and operatively connected to the lower wall, wherein an upper surface of the liquid weir is disposed below the upper wall of the separation vessel;
   a baffle plate disposed within the separation vessel between the gas dome and the liquid weir, the baffle plate operatively connected to the upper wall, wherein a lower surface of the baffle plate is disposed above the lower wall of the separation vessel and below the level of the upper surface of the liquid weir;
   a gas separation chamber within the separation vessel defined by the gas dome, the upper wall of the separation vessel, the baffle plate, and the level of the lower surface of the baffle plate;
   a hydrostatic pressure seal zone within the gas separation chamber between the level of the upper surface of the liquid weir and the level of the lower surface of the baffle plate, wherein the gas separation chamber and the hydrostatic pressure seal zone are configured for preventing a gas disposed within the gas separation chamber from escaping into a remainder of the separation vessel;
   a fluid inlet in fluid communication with an internal fluid line terminating within the gas separation chamber;
   a gas outlet extending from an upper portion of the gas dome; and
   a liquid outlet between the liquid weir and the second end of the separation vessel.

2. The separation system of claim 1, wherein the internal fluid line comprises a vertical section, an upper horizontal section, and a diverter, wherein the vertical section comprises an expansion section that increases a diameter of the vertical section, and wherein the diverter splits the upper horizontal section into two separate lines terminating within the gas separation chamber.

3. The separation system of claim 1, further comprising one or more ports extending through the upper wall of the separation vessel, wherein each port comprises a cover for sealing the port.

4. The separation system of claim 1, wherein the baffle plate is a transverse baffle plate transversely oriented within the separation vessel, and wherein the separation system further comprises a longitudinal baffle plate both operatively connected to the upper wall of the separation vessel, wherein the longitudinal baffle plate extends from the first end of the separation vessel to the transverse battle plate wherein a lower surface of the longitudinal baffle plate and a lower surface of the transverse baffle plate are both disposed above the lower wall of the separation vessel and below the level of the upper surface of the liquid weir, and wherein the gas separation chamber is further defined by the transverse baffle plate and the longitudinal baffle plate such that the gas separation chamber extends only partially across a width of the separation vessel near the first end.

5. The separation system of claim 1, further comprising a coalescing media framework disposed between the baffle plate and the liquid weir, wherein the coalescing media framework is configured for selectively housing one or more coalescing media units for separating hydrocarbon liquids from other liquid components disposed within the separation vessel.

6. The separation system of claim 5, wherein the coalescing media units comprise corrugated coalescing plates.

7. The separation system of claim 6, wherein the corrugated coalescing plates comprise stainless steel, aluminum, fiberglass, or polypropylene.

8. The separation system of claim 5, wherein the coalescing media units comprise a granular coalescing media.

9. The separation system of claim 8, wherein the granular coalescing media comprises polypropylene.

10. The separation system of claim 5, further comprising am oil bucket system disposed within the separation vessel and extending from a position near the first end to a position near the second end.

11. The separation system of claim 10, wherein the oil bucket system comprises one or more skimmers in fluid communication with an oil bucket for collecting a hydrocarbon liquid from a surface of a liquid contained in the separation vessel, the oil bucket system further comprising an oil discharge line positioned near the second end of the separation vessel and in fluid communication with the oil bucket for transferring a liquid from within the oil bucket to an oil outlet.

12. The separation system of claim 10, further comprising a second baffle plate disposed within the separation vessel between the coalescing media framework and the liquid weir, the second baffle plate having a lower surface disposed above the lower wall of the separation vessel.

13. A separation system comprising:
   a horizontal separation vessel comprising a first end, a second end, an upper wall, a lower wall, and a gas dome extending above the upper wall near the first end, the separation vessel containing a liquid;
   a liquid weir disposed within the separation vessel near the second end and operatively connected to the lower wall, wherein an upper surface of the liquid weir is disposed below the upper wall of the separation vessel, and wherein a liquid level of the liquid contained in the separation vessel is defined by the upper surface of the liquid weir;
   a baffle plate disposed within the separation vessel between the gas dome and the liquid weir, the baffle plate operatively connected to the upper wall, wherein a lower surface of the baffle plate is disposed above the lower wall of the separation vessel and below the liquid level;
   a gas separation chamber within the separation vessel defined by the gas dome, the upper wall of the separation vessel, the baffle plate, and the level of the lower surface of the baffle plate;
   a hydrostatic pressure seal zone within the gas separation chamber between the liquid level and the lower surface of the baffle plate, wherein the gas separation chamber and the hydrostatic pressure seal zone are configured for preventing a gas disposed within the gas separation chamber from escaping into a remainder of the separation vessel;
   a fluid inlet in fluid communication with an internal fluid line terminating within the gas separation chamber;
   a gas outlet extending from an upper portion of the gas dome; and
   a liquid outlet between the liquid weir and the second end of the separation vessel.

14. The separation system of claim 13, wherein the baffle plate comprises a transverse baffle plate and a longitudinal battle plate both operatively connected to the upper wall of the separation vessel, wherein the longitudinal baffle plate extends from the first end of the separation vessel to the transverse baffle plate, wherein a lower surface of the longitudinal baffle plate and a lower surface of the transverse baffle plate are both disposed above the lower wall of the separation vessel and below the liquid level, and wherein the gas separation chamber is further defined by the transverse baffle plate and the longitudinal baffle plate such that the gas separation chamber extends only partially across a width of the separation vessel near the first end.

15. The separation system of claim 13, further comprising a coalescing media framework disposed within the separation vessel between the baffle plate and the liquid weir, wherein the coalescing media framework is configured for selectively housing one or more coalescing media units for separating hydrocarbon liquids from other liquid components of the liquid contained within the separation vessel.

16. The separation system of claim 15, further comprising an oil bucket system disposed within the separation vessel and extending from a position near the first end to a position near the second end.

17. The separation system of claim 16, further comprising a second baffle plate disposed within the separation vessel between the coalescing media framework and the liquid weir, the second baffle plate having a lower surface disposed above the lower wall of the separation vessel.

18. A method of separating a fluid mixture containing a gas and a liquid, comprising the steps of:
   a) providing a separation system comprising: a horizontal separation vessel comprising a first end, a second end, an upper wall, a tower wall, and a gas dome extending above the upper wall near the first end; a liquid weir disposed within the separation vessel near the second end and operatively connected to the lower wall, wherein an upper surface of the liquid weir is disposed below the upper wall of the separation vessel; a baffle plate disposed within the separation vessel between the gas dome and the liquid weir, the baffle plate operatively connected to the upper wall wherein a lower surface of the baffle plate is disposed above the lower wall of the separation vessel and below the level of the upper surface of the liquid weir; a gas separation chamber within the separation vessel defined by the gas dome, the upper wall of the separation vessel, and the lower surface of the baffle plate;
   b) feeding the fluid mixture through a fluid inlet and an internal fluid line of the separation vessel and into the gas separation chamber;
   c) allowing the gas to rise within the gas separation chamber, and allowing the liquid to fall within the gas separation chamber to a liquid level within the gas separation chamber;
   d) allowing the gas to exit the separation vessel through a gas outlet extending from an upper portion of the gas dome;
   e) preventing the gas from escaping from the gas separation chamber into a remainder of the separation vessel by a hydrostatic pressure seal formed by the liquid disposed in the gas separation chamber between the level of the upper surface of the liquid weir and the level of the lower surface of the baffle plate;
   f) allowing the liquid to flow under the lower surface of the baffle plate and over the upper surface of the liquid weir;
   g) discharging the liquid through a liquid outlet positioned between the liquid weir and the second end of the separation vessel.

19. The method of claim 18, further comprising the step of:
   h) inspecting or sampling the liquid in the separation vessel outside of the gas separation chamber by opening a cover of a port extending through the upper wall of the separation vessel.

20. The method of claim 18, further comprising the steps of:
   h) monitoring the liquid level within the separation vessel;
   i) pumping liquid from the separation vessel through the liquid outlet when the liquid level reaches a predetermined level high.

21. The method of claim 20, further comprising the steps of:
   h) monitoring the liquid level within the gas separation chamber;
   i) pumping liquid from the separation vessel through the liquid outlet when the liquid level within the gas separation chamber reaches a predetermined level high.

22. The method of claim 18, wherein the separation system comprises a coalescing media framework disposed within the separation vessel between the plate and the liquid weir the coalescing media framework housing one or more coalescing media units; wherein step (f) further comprises:
   i) causing the liquid to flow through the one or more coalescing media units to separate a hydrocarbon component out of the liquid such that the hydrocarbon component rises to the surface of the liquid level.

23. The method of claim 22, wherein the separation system further comprises an oil bucket system disposed between the separation vessel and extending from a position near the first end to a position near the second end; wherein step (f) further comprises:
    ii) collecting the hydrocarbon component from the surface of the liquid level with a skimmer of the oil bucket system;
    iii) allowing the collected hydrocarbon component to flow into an oil bucket of the oil bucket system; and
    iv, discharging the collected hydrocarbon component through an oil discharge line and an oil outlet positioned near the second end of the separation vessel.

24. The method of claim 23, further comprising the steps of:
    h) monitoring the level of the hydrocarbon component within the oil bucket;
    i) pumping the hydrocarbon component from the oil bucket through the oil discharge line and the oil outlet when the level of the hydrocarbon component in the oil bucket reaches a predetermined level high.

\* \* \* \* \*